Nov. 18, 1952     H. A. BOUSHEY     2,618,197
PICTURE DISPLAY APPARATUS WITH DURATION OF DISPLAY
CONTROLLED BY THE PICTURE CARRIER
Filed July 13, 1950     4 Sheets-Sheet 1

INVENTOR
HOMER A. BOUSHEY
BY Scrivener & Parker
ATTORNEYS

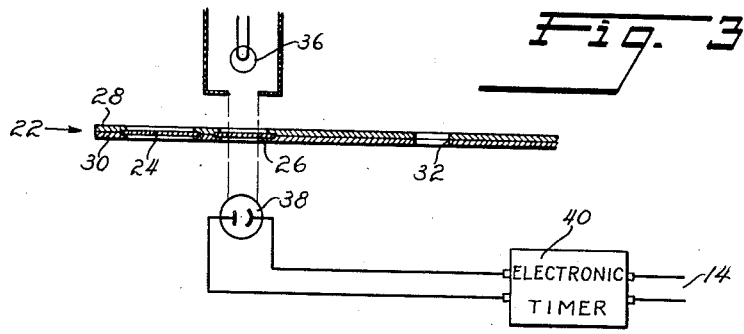
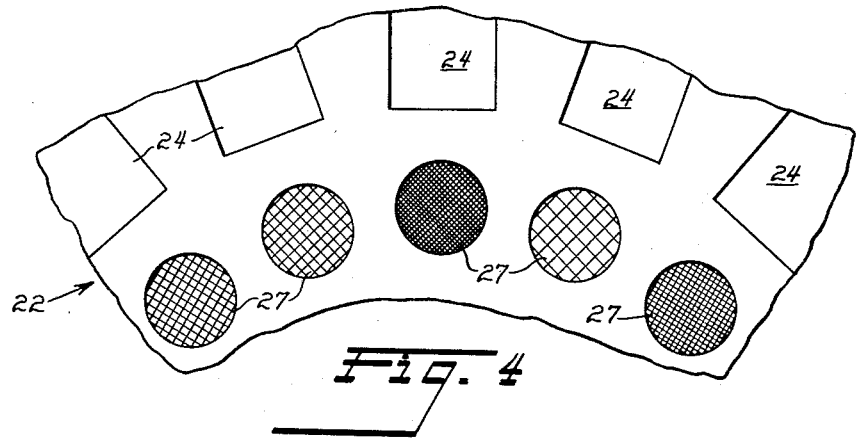
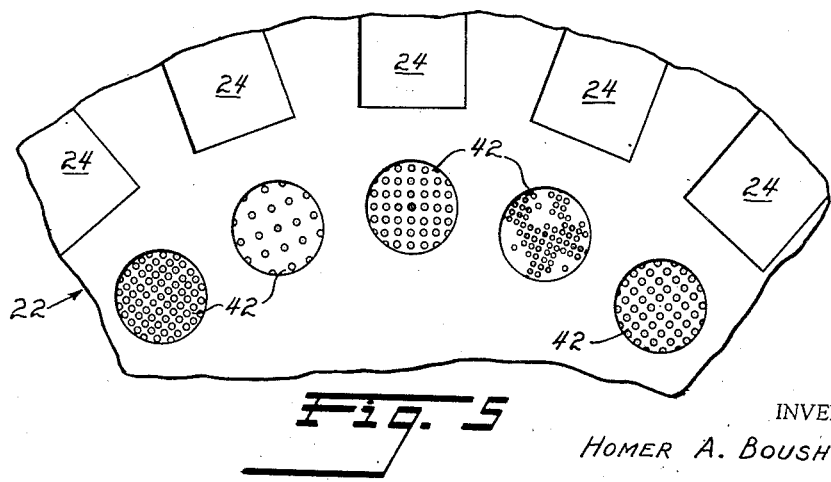

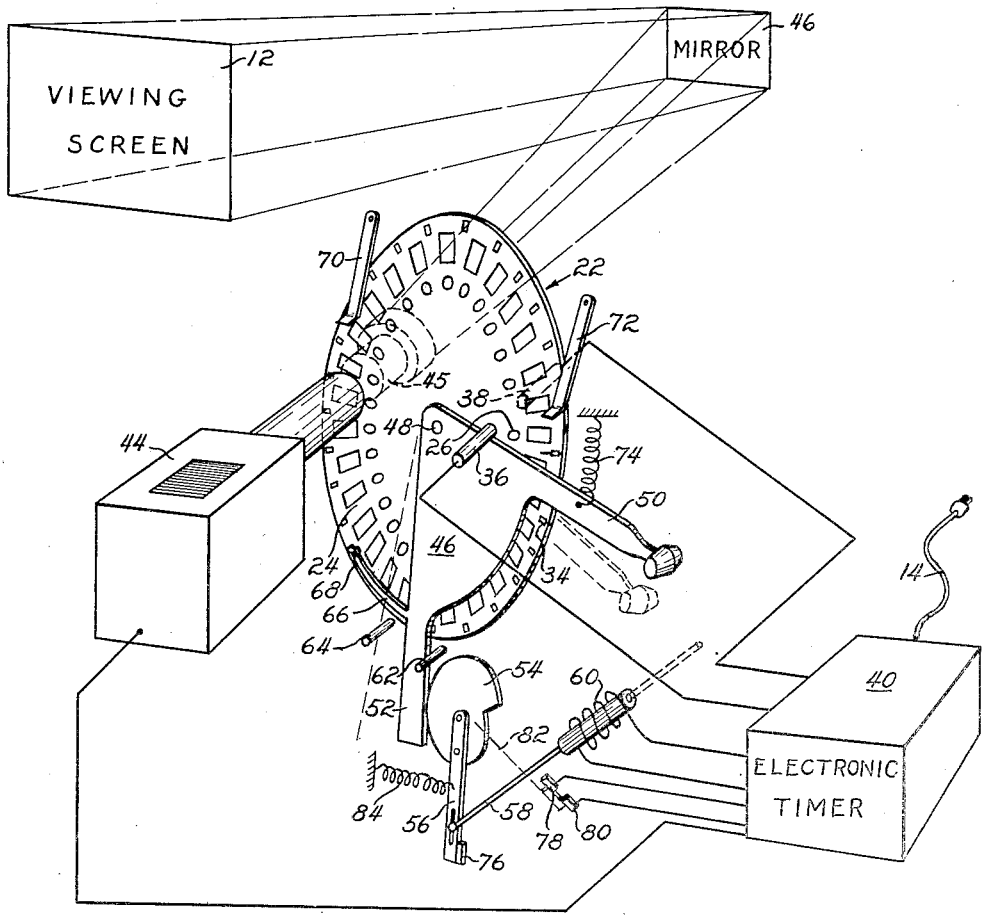

Patented Nov. 18, 1952

2,618,197

UNITED STATES PATENT OFFICE 2,618,197

PICTURE DISPLAY APPARATUS WITH DURATION OF DISPLAY CONTROLLED BY THE PICTURE CARRIER

Homer A. Boushey, Washington, D. C.

Application July 13, 1950, Serial No. 173,666

16 Claims. (Cl. 88—27)

1

This invention relates to the projection of still pictures, and more particularly to an apparatus for automatically projecting upon a screen or the like, a series of still pictures or images in synchronism with a related sound program.

In accordance with present practice, it is usual in systems for the projection of a series of still pictures, to shift the pictures manually. To assist the operator, audible tone signals may be recorded and reproduced along with the correlated sound program, in order to indicate when the pictures are to be shifted so as to maintain program synchronization. The main objection to this arrangement is that the tone signals are audible to the audience and tend to distract attention from the picture and sound sequence. A further objection is that the services of an operator are continuously required.

While certain devices to overcome these objections have heretofore been proposed, it has been found that they require special attachments to the sound producing mechanism, are complicated and costly, and may require wholly different and new apparatus which does not permit operation in cooperation with conventional sound reproducing devices.

Accordingly, it is the principal object of the present invention to provide a projection apparatus which may be readily operated in synchronism with a sound program, and which is so constructed and arranged as to avoid the difficulties and undesirable features referred to above.

Another object is to provide a novel projection apparatus which, after initially having been started in synchronism with a sound program, will automatically continue to project a series of pictures or images in synchronism therewith.

Still another object is to provide a novel time control mechanism which automatically controls the individual time intervals of projection of each picture of the series during display thereof.

A further object is to combine the time control mechanism with the picture support in such a manner that each picture frame is provided with an associated time control element, such an arrangement dispensing with the necessity of providing a separate timing disc or other such device.

A still further object is to provide a novel disc or record which supports not only the picture sequence, but also a series of time control elements therefor, the arrangement being such that the time control elements automatically control the desired time of projection of the respective associated picture frames in synchronism with a related sound program.

Still another object is to provide a novel construction which may be relatively inexpensive to manufacture but which may be easily controlled in order to function in a highly efficient manner.

Other objects and novel features of the invention will appear more fully hereinafter from the following detailed description when taken in connection with the accompanying drawings, which are illustrative of preferred forms of the invention. It is to be expressly understood, however, that the drawings are utilized for purposes of illustration only and are not designed as a definition of the limits of the invention, reference being had for this purpose to the appended claims.

Referring to the drawings wherein similar reference characters refer to similar parts throughout the several views, Fig. 1 is a perspective view of a picture projecting apparatus embodying the principles of the present invention, the figure also including a representation of a conventional sound reproducing device;

Fig. 3 is a schematic view partly in section illustrating a portion of the disc of Fig. 2 in combination with certain parts of the time interval regulating device;

Fig. 4 is an enlarged view of a portion of the disc of Fig. 2 and illustrates one manner of constructing the time control elements;

Fig. 5 is a view similar to Fig. 4 and illustrates a modified form of the time control elements;

Fig. 7 is a diagrammatic view in perspective of the major portions of the invention.

In its broader aspects, the present invention relates to an arrangement for successively projecting a series of still picture frames in coordination with a related sound program. The construction is moreover such that synchronism between the picture sequence and the sound program is secured without the necessity of any mechanical or electrical connections between the sound reproducing device and the projection apparatus.

More specifically, the present invention provides a novel construction wherein a plurality of translucent timing elements are respectively associated with individual picture frames in such a manner that light sensitive control means are brought into play to govern the step by step advance of the picture projecting apparatus in order to obtain desired time intervals of the projection of individual picture frames. The translucence of the time control elements is predetermined by the related sound program in order to obtain proper synchronization between the latter and the projection device. Thus the invention in its more specific aspects provides an automatically operable projection apparatus which operates to successively display individual picture frames in a manner fully coordinated and synchronized with a corresponding sound sequence.

Figure 1:
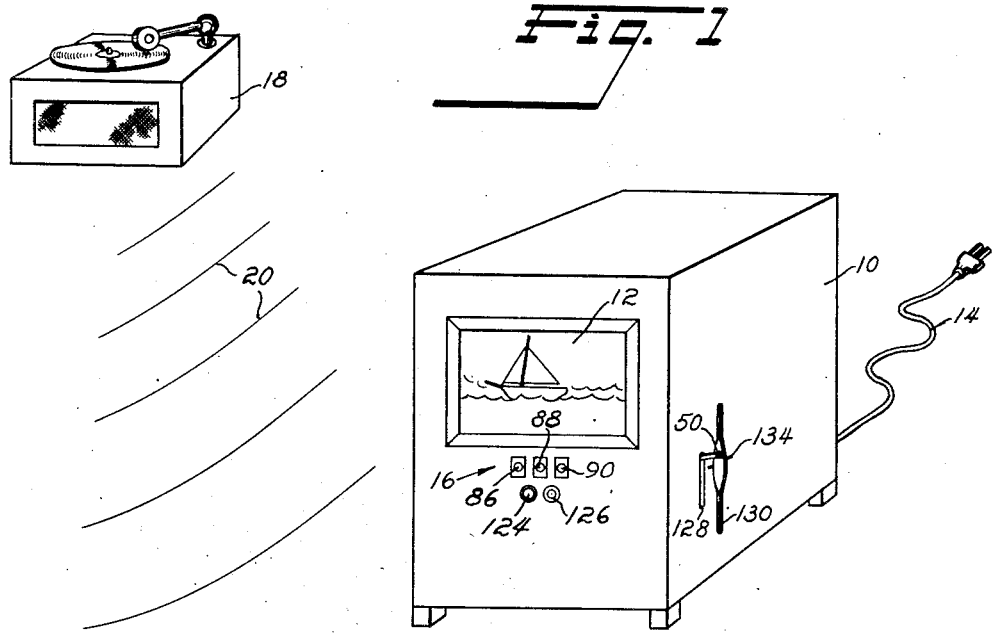

Referring more particularly to Fig. 1, the present invention is illustrated therein as including a suitable cabinet 10 which is provided with a viewing screen 12 on the front face thereof, the cabinet having a suitable electrical supply cord 14 for energizing the apparatus, and being also provided on the front face thereof with a plurality of controls 16. A sound reproducing device 18 of any suitable type may be employed and the representations at 20 of sound waves emanating from the device 18 is merely illustrative of the fact that the invention functions in synchronism with a sound program reproduced by the device 18.

One of the important features of the present invention resides in the use of a plurality of sequentially arranged picture frames in combination with related time control elements which function, in a manner to be more clearly pointed out hereinafter, to supervise and control step by step movement of the picture frames for successive projection thereof in accordance with a prearranged time sequence. As shown more particularly in Figs. 2 to 5, the present invention provides a disc 22 for supporting a plurality of picture frames 24 and a plurality of time control elements 26. The disc 22, see Fig. 3, may comprise a pair of superposed disc elements 28 and 30 of pressed cardboard or like material and which are provided with suitable openings for supporting the picture frames 24 and the time control elements 26 in two concentric annular series. It is understood that with such an arrangement, the disc 22 is opaque except for the areas defined by the picture frames 24 and the control elements 26. On the other hand, the disc 22 may comprise a pair of transparent plastic disc-like elements in which event the frames 24 and the elements 26 may be formed on a film annulus. In this case, it will be understood that the spaces between the frames 24 and the elements 26 will have maximum opaqueness. For a purpose which will appear more fully hereinafter, the marginal portion of the disc 22 is provided with a plurality of index notches 34 for advancing the disc about its center in a step by step manner.

The control elements 26 may be constituted by photographic film sections wherein the desired degree of translucence may be obtained by varying the grain density or shade of the elements. In some cases however, as for example where it is desired to avoid any inaccuracies of shade variations which may be caused by slightly different exposure or printing times, overall black and white patterns illustrated at 27 and 42 in Figs. 4 and 5 may be employed. In Fig. 4 the time control elements are illustrated as including double cross-hatching, the black lines being of maximum opaqueness. In Fig. 5 the time control elements 42 are illustrated as including a plurality of small circles. It will be understood that these lines and circles are blackened, and that hence an overall black and white pattern is achieved. It will be understood that the average light transmitting properties of the elements 27 and 42 of Figs. 4 and 5, would not be affected by any minor variations in exposure or printing times. It will also be understood that the light transmitting properties of the elements 27 and 42 correspond to the desired intervals of time of exposure of individual picture frames associated therewith.

In order to control the advancement of the disc 22, a source of steady light 36 is positioned so that the control elements 26 may be brought successively into registry therewith during movements of the disc. The light from the source 36, as will be readily observed from Fig. 3, passes through elements 26 and is directed onto a photo-electric cell 38 which is effective, through operation of an electronic timing device 40, to control the movements of the disc 22 in accordance with the translucence of the control elements 26. Hence, the step by step movement of the disc 22 is automatically controlled by the elements 26 and it will therefore be observed that the desired time interval of projection of a particular picture frame may be readily controlled by its associated time control element 26. The particular manner in which the disc 22 is advanced and the particular construction of the timer 40 will be set forth more fully in the description which follows.

A further feature of the invention resides in the manner of the control of the disc 22 so that the latter may be advanced in a step by step fashion, the time intervals between each advancement being controlled by the time control elements 26 or 42. Referring more particularly to Fig. 7, the disc 22 is diagrammatically illustrated therein in association with the basic operating devices of the present invention. For example, a projection lamp 44 is arranged to project light through the picture frames 24 and through a lens system 45, onto a mirror 46, the image being thereafter reflected forwardly to the viewing screen 12. Also as shown, the light source 36 is positioned in such a manner that the control elements 26 may be successively registered therewith in order to control the operation of the electronic timer 40. In connection with the location of the control elements 26 with respect to the picture frames 24, it is desired to point out that these need not be adjacent each other. For example and referring to Fig. 2, the sequential arrangement of the picture frames may be such as that shown in A to Q. The control elements may be as shown in B' to Q'. Such an arrangement obviously is such that the projection lamp 44 and the light source 36 may be arranged on opposite sides of the center of the disc 22.

In order to move the disc 22 to effect successive registry of the picture frames 24 with the projection lamp 44, the present invention provides a bell crank 46 pivotally mounted at 48 to a stationary part and provided with outwardly extending arms 50 and 52. The lower arm 52 is adapted to be moved in a clockwise direction about its pivot as by means of a cam 54, the latter being provided with an operating arm 56 secured to an armature 58 of a solenoid 60. Cam 54 is suitably pivotally mounted to a stationary part and is adapted to move the bell crank arm 52 away from a pin 62 against a stop pin 64, when the solenoid 60 is energized by the electronic timer 40. When this movement of arm 52 occurs, a spring arm 66 having an end 68 received within one of the index slots 34, moves the disc 22 in a clockwise direction about its center point. As soon as the disc has moved a distance corresponding to the distance between the pins 62 and 64, the lower ends of spring finger detents 70 and 72 will respectively engage a pair of the index slots 34. Thus, after deenergization of the solenoid 60, the spring detents 70 and 72 will maintain the disc 22 in its then position while the bell crank 46 is returned to the position illustrated in Fig. 7 through the action of a spring 74 connected between a stationary part and the upper bell crank arm 50. As the bell crank 46 returns to normal, the end 68 of the spring arm 66 will engage the following index slot 34 in order to again shift the disc 22 to bring the succeeding picture frame 24 into registry with the projection lamp 44 after the solenoid 60 has been re-energized by the electronic timer 40. It will be observed from Fig. 7 that the arm 56 carries a contact 76 which is adapted to connect contacts 78 and 80 when the arm 56 reaches the dotted line position 82. It will also be observed that the cam 54 is so formed that the arm 56 may partake of an over-travel movement to reach the position 82 after the bell crank arm 52 has moved to such a position as to engage the limit pin 64. With this construction, engagement between the contacts 76, 78 and 80 is assured during movement of the arm 56 against the action of its return spring 84 to control the electronic timer 40 without disturbing the fully advanced position of the bell crank 46. This over-travel action of the cam 54 is highly desirable in that the apparatus may be made less sensitive to improper adjustment and may hence be rendered more dependable in operation and less expensive to manufacture.

Figure 6:
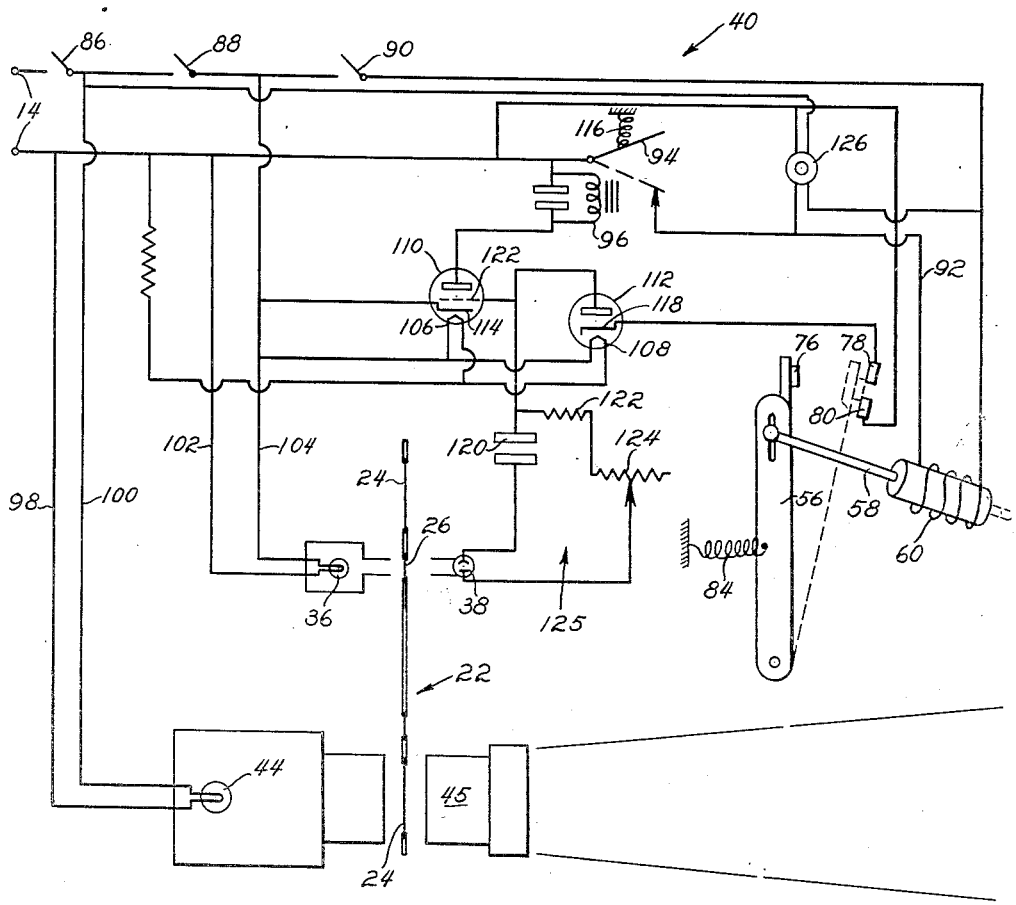
Fig. 6 is a diagrammatic view of the electronic timing circuit which may be employed with the invention.

The electronic timing mechanism 40 is illustrated more particularly in Fig. 6 and includes a novel timing arrangement for controlling the action of the arm 56 which is connected to the cam 54 of Fig. 7. More particularly, the timer 40 includes the supply conductors 14, a main switch 86, a warm up switch 88 and a start-stop switch 90, these being arranged in series with one side of the solenoid 60. The other side of the solenoid 60 is connected through 92 with one of the supply conductors 14, such connection including a normally open contact arm 94 of a relay 96. Closure of the main switch 86 serves to establish a circuit to the projection lamp 44 by way of conductors 98 and 100. Subsequently, closure of the warm up switch 88 establishes, through connections 102 and 104, a circuit through the steady source of light 36. Simultaneously, the heaters 106 and 108 of a pair of electron discharge tubes 110 and 112 are energized and the cathode 114 of the tube 110 is connected to the supply conductor 14. As soon as the heater 106 warms the tube 110 sufficiently, the said tube becomes conductive and allows current to flow through the relay 96. When this occurs, the contact arm 94 is moved against the tension of its return spring 116 to the dotted line position. With the system in this condition automatic operation thereof may be initiated by closure of the start-stop switch 90.

As soon as the switch 90 is closed, solenoid 60 will be energized by reason of the previous closing of the contact arm 94. Energization of the solenoid will draw the armature 58 to the right as viewed in Fig. 6 and will cause a clockwise movement of the arm 56 against the tension of its return spring 84. As soon as contacts 76, 78 and 80 are engaged, cathode 118 will be energized in order to enable current to flow through the tube 112. Such current flow charges a condenser 120 in such a manner that grid 122 will be negatively charged and will immediately block the action of the tube 110. Current flow to the relay 96 is thereupon interrupted in order to allow the arm 94 to break the circuit to the solenoid 60. When this occurs, the arm 56 returns to the normal position illustrated, through the action of spring 84 and the tube 112 is rendered non-conductive.

It will be observed that the photoelectric cell 38 is arranged in series with the condenser 120, a fixed resistance 122 and a variable resistance 124. With the latter resistance adjusted to a particular value, it will be understood that the circuit including these elements constitutes a timing control circuit 125 for determining and timing the period of blocking of the tube 110. The only variable in this circuit is the photoelectric cell 38, the resistance of which is dependent upon the light directed to it. The amount of such light is in turn governed by the translucence of the control element 26 which is, at the moment, interposed between the light source 36 and the cell 38. Thus as the charge on condenser 120 is dissipated through the resistance elements 122 and 124 as well as the cell 38, the resistance of the latter will determine the time period in which the blocking action of the tube 110 persists. As soon as the negative bias on the grid 122 drops to a predetermined value, the tube 110 again becomes conductive and energizes the relay 96. When this occurs, the contact arm 94 is again moved to the dotted line position and the sequence of operations heretofore outlined is repeated. Thus it is seen that the translucence of the control element 26 effects a timing control of the action of the tube 110 through the photoelectric cell 38, the condenser 120 and the resistances 122 and 124. The latter resistance is variable and may be adjusted so that the projection apparatus will operate in proper synchronization with the associated sound program as reproduced by the device 18.

If desired, a double contact button type of switch 126 may be provided for connecting the solenoid 60 to the supply conductors 14 so that by manually operating the switch 126, the solenoid may be energized whenever desired.

Figure 2:
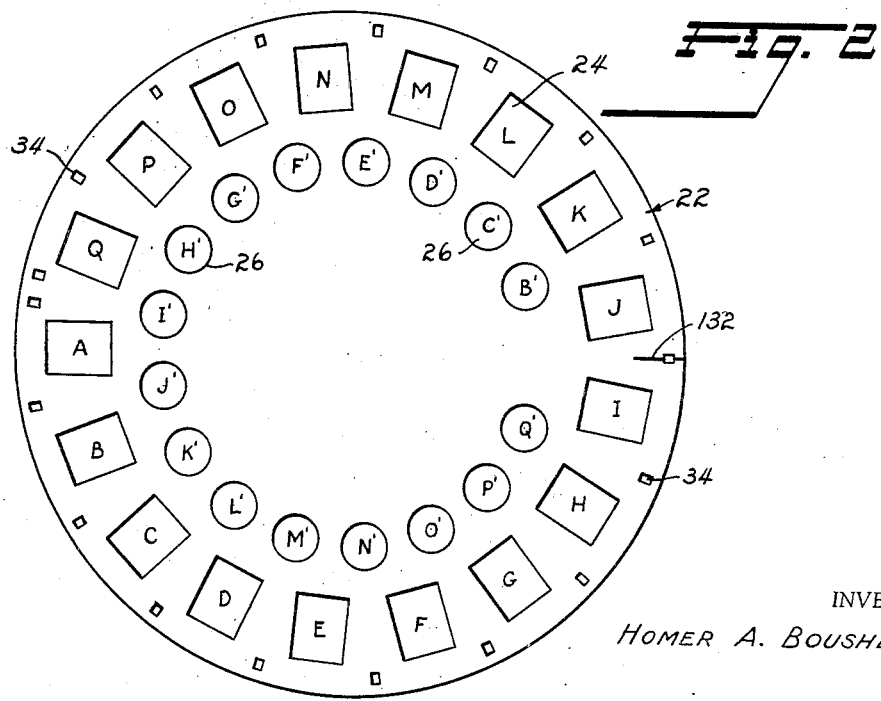
Fig. 2 is a plan view of a disc on which the picture sequence and time control elements are mounted.

In operation and referring to Figs. 1 and 2, it will be observed that the cabinet 10 is provided with a pair of slots 128 and 130 in the side thereof. The upper bell crank arm 50 of the bell crank 46 projects through the slot 128 so that at any time, the operator may advance the disc 22 by merely pressing downwardly on the arm 50. Slot 130 is provided for receiving the disc 22, the latter being provided with an index 132 for alignment with a corresponding index 134 on the cabinet when the disc 22 is slipped into place. Assuming therefore that the parts are in the position indicated in Figs. 1 and 7, it will be observed that the projection lamp 44 is aligned with the first picture frame A of Fig. 2, and that the light source 36 is positioned to register with the control element B' as soon as the disc has been shifted to a position where the picture frame B is aligned with the picture lamp 44. Switches 86 and 88 are then closed in order to permit the heaters 106 and 108 of the tube 110 and 112 to warm up. Closure of the switch 86 energizes the projection lamp 44 and the picture frame A, probably representing the title of the sequence, will immediately be projected on the viewing screen 12. The accompanying sound program is then started on any appropriate apparatus such as the reproducer 18. The first portion of the sound program preferably consists of a reading of the title accompanied probably by some background music. Thereafter, a tone signal will be sounded at which instant the start-stop switch 90 is closed in order to permit energization of the solenoid 60 and an immediate advancement of the disc 22 to bring the picture frame B into alignment with the projection lamp and to bring the control element B′ into registry with the steady light source 36.

It will be observed that as soon as the solenoid 60 is energized, the tube 112 is rendered operative through engagement of contacts 76, 78 and 80. Also, the action of the tube 110 is blocked by the negative basis charge created across the condenser 120, and the relay 96 drops out. Return spring 84 promptly moves the cam 54 to its original normal position shown in Fig. 7 and the bell crank 46 also returns to normal position through the action of its associated return spring 74. The disc 22 is held in its new position through the action of the spring detents 70 and 72 and the spring finger 66 re-engages one of the index notches 34 in order to be ready for a subsequent advancing movement of the disc.

As heretofore pointed out, the translucence of the control elements 26 or 42 is governed by the related sound sequence for its associated picture frame. Hence, the translucence of the control element B′ governs the action of the photoelectric cell 38 and associated parts 120, 122 and 124 in such a manner that when the sound sequence associated with the picture frame B is ended, the tube 110 will again become conductive in order to close the contact arm 94 and re-energize the solenoid 60. As soon as this occurs, the cam 54 will be rotated in a counter-clockwise direction as viewed in Fig. 7, to move the bell crank 46 against the stop pin 64 and disc 22 is advanced another frame through engagement of the spring finger 66 with the index slot 34. Cam 54, due to its construction, is permitted to over-travel a distance sufficient to bring the contacts 76, 78 and 80 into engagement and re-energize the tube 112 to again block the action of the tube 110. With the blocking of the latter, the contact arm 94 is moved to its upper position as viewed in Fig. 6, the solenoid 60 is de-energized and the cam 54 and the bell crank 46 again return to their normal positions through the action of the return springs 84 and 74, respectively associated therewith.

From the foregoing, it will be readily perceived that the picture frames of the entire series will be sequentially displayed in proper timed relation with the related sound program. Each of the time control elements 26 is so constructed that the light transmitting properties thereof governs the timing of the electronic timer 40. At the end of the sound sequence, a further tone signal may be given and in the event that the projection apparatus is not exactly coincident with the final tone signal, adjustment may be made through the resistance 124. For example, if the apparatus is correctly adjusted, the tone signal would exactly coincide with the completion of the display of the last picture frame. However, should the last picture shift occur too early or too late, the resistance 124 may be adjusted to compensate. Once properly regulated for synchronous operation with a particular sound reproducing device, readjustment would not be required.

If for any reason it were desirable to affect manual shift of the disc 22, this may be readily effected by moving the arm 50 which projects through the slot 128 of the cabinet 10. In such event it would only be necessary to close the switch 86 which energizes the projection lamp 44. Also, if semi-automatic operation is desired, this may be readily effected by push button operation of the switch 126. Here again, it would only be necessary to close the switch 86. Finally, if during fully automatic operation with the switches 86, 88 and 90 closed, the switch 126 is also closed, it will be readily understood that the accompanying energization of the relay 60 would immediately shift the disc to project the next image. However, resumption of the automatic timing features would immediately follow.

The present invention thus affords a novel yet simple arrangement for automatically controlling the successive projection of still picture frames in synchronism with a related sound program. The arrangement of picture frames and control elements on a single disc presents a simplified and compact construction and one which is unusually efficient in the governing of the picture shifting mechanism.

While the invention has been shown and described herein with considerable particularity, it will be understood by those skilled in the art that various modifications may be resorted to without departing from the spirit of the invention. Reference will therefore be had to the appended claims for a definition of the limits of the invention.

What is claimed is:

1. In a device for projecting a plurality of picture frames arranged in sequence, picture projecting means, means for advancing said frames step by step to successively bring individual picture frames into alignment with the projecting means, and means for operating the advancing means, comprising a light transmitting element associated with each picture frame, the light transmitting properties of such elements varying in accordance with the desired time of projection of the respective associated picture frames, a steady light source successively registering with said elements, a light sensitive cell responsive to the amount of light transmitted through said elements by said light source, and timing means controlled by said cell for successively operating said advancing means after predetermined time intervals determined by the amount of light directed on said cell through said light transmitting elements.

2. In a picture projecting device having a support provided with a plurality of picture frames arranged in sequence thereon, picture projecting means, means for advancing said support frame by frame to successively bring individual picture frames into registry with the projecting means, and means for operating said advancing means to obtain variable time intervals of projection of respective picture frames, comprising a plurality of light transmitting elements sequentially arranged on said support and respectively associated with the respective picture frames, the light transmitting properties of each element varying in accordance with the desired time of projection of its associated picture frame, a steady light source with which the elements are adapted to successively register as the support is advanced to bring the associated picture frames into registry with the projecting means, light sensitive means responsive to the light transmitted through said elements by said light source, and a timing device controlled by said light sensitive means for successively operating said advancing means after predetermined time intervals determined by the amounts of light directed on said light sensitive means through said light transmitting elements.

3. In a device for projecting a plurality of picture frames arranged in sequence, picture projecting means, a motor for advancing said frames step by step to successively bring individual picture frames into registry with the projecting means, and means for controlling said motor, comprising a light transmitting element associated with each picture frame, the light transmitting properties of such elements varying in accordance with the desired time of projection of the respective associated picture frames, means including an electronic timing circuit to operate said motor when the circuit is energized, and means controlled by the light transmitted through said elements for controlling the energization of said timing circuit.

4. In a device for projecting a plurality of picture frames arranged in sequence, picture projecting means, a motor for advancing said frames step by step to successively bring individual picture frames into registry with the projecting means, and means for controlling said motor, comprising a light transmitting element associated with each picture frame, the light transmitting properties of such elements varying in accordance with the desired time of projection of the respective associated picture frames, a steady light source successively registering with said elements, an electronic timing circuit adapted when energized to operate said motor, and means for controlling the energization of said timing circuit including a light sensitive cell responsive to the light transmitted through said elements by said light source.

5. In a picture projecting device having a support provided with a plurality of picture frames arranged in sequence thereon, picture projecting means, a motor for advancing said support frame by frame to successively bring individual picture frames into registry with the projecting means, and means for controlling said motor, comprising a plurality of light transmitting elements sequentially arranged on said support and respectively associated with the respective picture frames, the light transmitting properties of each element varying in accordance with the desired time of projection of its associated picture frame, a steady light source with which the elements are adapted to successively register as the support is advanced to bring the associated picture frames into registry with the projecting means, an electronic timing circuit adapted when energized to operate said motor, and means for controlling the energization of said timing circuit including a light sensitive cell responsive to the light transmitted through said elements by said light source.

6. In a device for projecting a plurality of sequentially arranged picture frames, in synchronization with a related sound program, picture projecting means, a motor for advancing said frames to successively bring individual picture frames into registry with the projecting means, and means to periodically energize said motor in synchronism with said sound program, comprising a light transmitting element associated with each picture frame, the light transmitting properties of such elements varying in accordance with the desired time of projection of the respective associated picture frames as determined by said sound program, and electronic timing means responsive to the light transmitted through said elements for energizing said motor.

7. In a picture projecting device having a support provided with a plurality of picture frames arranged in sequence thereon, picture projecting means, a motor for advancing said support frame by frame to successively bring individual picture frames into registry with the projecting means, a relay for energizing and de-energizing said motor, and means for timing the action of said relay, comprising an electronic timing circuit, a light sensitive cell in said circuit, a plurality of light transmitting control elements sequentially arranged on said support and respectively associated with the respective picture frames, the light transmitting properties of each element varying in accordance with the desired time of projection of its associated picture frame, and a light source for projecting light through said control elements to said light sensitive cell.

8. In a device for projecting a plurality of picture frames arranged in sequence, picture projecting means, means for advancing said frames step by step to successively bring individual picture frames into alignment with the projecting means, and means for controlling the advancing means, comprising a light transmitting element associated with each picture frame, each element having an overall black and white pattern, the average light transmitting properties of which vary in accordance with the desired time of projection of the respective associated picture frames, a steady light source successively registering with said elements, a light sensitive cell responsive to the light transmitted through said elements by said light source, and timing means controlled by said cell and operatively connected with the advancing means.

9. In a picture projecting device having a support provided with a plurality of picture frames arranged in sequence thereon, picture projecting means, means for advancing said support frame by frame to successively bring individual picture frames into registry with the projecting means, and means for timing the action of said advancing means to obtain variable time intervals of projection of respective picture frames, comprising a plurality of light transmitting elements sequentially arranged on said support and respectively associated with the respective picture frames, each element having an overall black and white pattern, the average light transmitting properties of each element varying in accordance with the desired time of projection of its associated picture frame, a steady light source with which the elements are adapted to successively register as the support is advanced to bring the associated picture frames into registry with the projecting means, light sensitive means responsive to the light transmitted through said elements by said light source, and a timing device controlled by said light sensitive means for successively operating said advancing means.

10. In a picture projecting device having a support provided with a plurality of picture frames arranged in sequence thereon, picture projecting means, a motor for advancing said support frame by frame to successively bring individual picture frames into registry with the projecting means, and means for controlling said motor, comprising a plurality of light transmitting elements sequentially arranged on said support and respectively associated with the respective picture frames, each element having an overall black and white pattern, the average light transmitting properties of each element varying in accordance with the desired time of projection of its associated picture frame, an electronic timing circuit adapted when energized to operate said motor, and means controlled by the light transmitted through said elements for controlling the energization of said timing circuit.

11. In a device for projecting a plurality of picture frames arranged in sequence, picture projecting means, means including a pivotally mounted member movable in one direction for advancing said frames step by step to successively bring individual picture frames into registry with the projecting means, a spring for returning said member to normal position after each movement thereof in said one direction, and means for controlling the movements of said member in said one direction, comprising a cam, a motor for rotating said cam, and means for timing the operation of said motor comprising an electronic timing circuit, a light sensitive cell in said circuit, a light transmitting control element for each picture frame, the light transmitting properties of such elements varying in accordance with the desired time of projection of the respective associated picture frames, and a light source for projecting light through said control elements to said light sensitive cell.

12. A device of the type set forth in claim 11 wherein the control elements have an overall black and white pattern.

13. In a picture projecting device, a disc having an annular series of spaced-apart openings, a picture frame mounted within each opening, a second annular series of spaced-apart openings arranged concentrically with respect to said first series, and a translucent timing control element mounted within each opening of said second series, picture projecting means, means for advancing said disc step by step to successively bring individual picture frames into alignment with the projecting means, a light source arranged to successively register with individual control elements during step by step movement of said disc, and timing means controlled by light passing from said source through said control elements for operating the advancing means.

14. In a picture projecting device, a disc having an annular series of spaced-apart openings, a picture frame mounted within each opening, a second annular series of spaced-apart openings arranged concentrically with respect to said first series, and a translucent timing control element mounted within each opening of said second series, picture projecting means, a motor for moving said disc step by step to successively bring individual picture frames into alignment with the projecting means, a light source arranged to successively register with individual control elements during movement of said disc, an electronic timing circuit controlled by light passing from said source through said control elements, and a relay energized by said timing circuit for operating said motor.

15. A device of the type set forth in claim 14 wherein the control elements have an overall black and white pattern.

16. A combined picture and time control device comprising a pair of superimposed disc-like elements forming a disc, each of said elements being of transparent plastic material, and an annular film strip interposed between said elements and having spaced-apart picture frames and a plurality of translucent timing control elements, the areas of said strip between said picture frames and timing control elements being opaque.

HOMER A. BOUSHEY.

REFERENCES CITED

The following references are of record in the file of this patent:

UNITED STATES PATENTS

| Number | Name | Date |
|---|---|---|
| 1,096,873 | Victor | May 19, 1914 |
| 1,732,302 | Fessenden | Oct. 22, 1929 |
| 1,909,765 | Jenkins et al. | May 16, 1933 |
| 1,987,544 | Wood et al. | Jan. 8, 1935 |
| 2,024,542 | Simon | Dec. 17, 1935 |
| 2,086,554 | Hoorn | July 13, 1937 |
| 2,140,350 | Dawson | Dec. 13, 1938 |
| 2,165,048 | Gulliksen | July 4, 1939 |
| 2,349,941 | Cramwinckel et al. | May 30, 1944 |
| 2,399,668 | Francis | May 7, 1946 |
| 2,511,334 | Gruber | June 13, 1950 |

FOREIGN PATENTS

| Number | Country | Date |
|---|---|---|
| 858,233 | France | May 6, 1940 |